Feb. 24, 1953 V. H. WILEY 2,629,764
AUTOMOBILE RADIO CABINET WITH COVER CONTACT CLIPS
Filed June 7, 1949
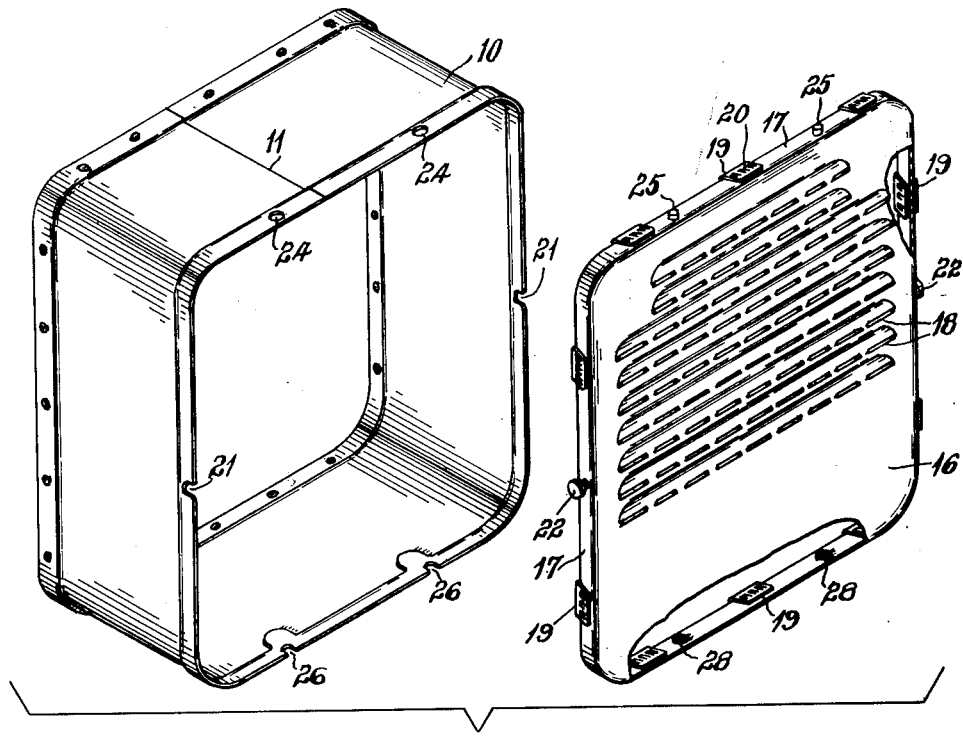
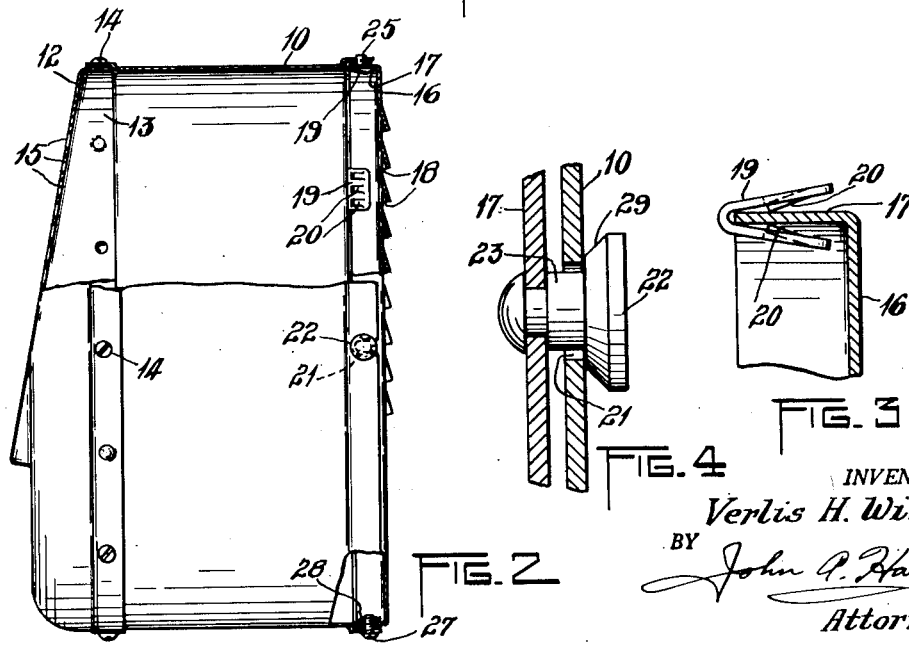
INVENTOR.
Verlis H. Wiley
BY John A. Harvey
Attorney Patented Feb. 24, 1953

2,629,764

UNITED STATES PATENT OFFICE 2,629,764

AUTOMOBILE RADIO CABINET WITH COVER CONTACT CLIPS

Verlis H. Wiley, Kenmore, N. Y., assignor, by mesne assignments, to Sylvania Electric Products Inc., New York, N. Y., a corporation of Massachusetts Application June 7, 1949, Serial No. 97,689

5 Claims. (Cl. 174—35)

1

The present invention relates to metallic housings for enclosing automobile radio receivers, and particularly to such housings wherein it is desired that at least one of the front and back covers of the housing shall be easily and readily removable to gain access to the tubes and other circuit components of the receiver.

Automobile radio receivers are conventionally enclosed within a relatively rigid metallic housing, usually formed of sheet steel, to provide adequate mechanical protection for the receiver and to shield it against high-frequency electromagnetic energy arising from the normal operation of the ignition system of the automobile. Such housings have heretofore frequently been constructed by a drawing process which enables five sides of the housing to be formed in one piece. The sixth side of the housing is removable for purposes hereinabove mentioned, and is usually secured in place by machine screws or removable split rivets inserted through corresponding holes in the housing and flanged edge of the removable side. Since positive and consistent electrical connection is required between the housing and the removable side to insure adequate shielding of the receiver from ignition disturbances, spring contact members are distributed around the juncture of the housing and its removable side. The drawing process employed to form housings of the type described usually requires the use of a relatively heavy sheet material, so that these housings are relatively rigid and not readily deformable by the stiff spring contact members last mentioned.

It would be desirable to provide an automobile radio receiver housing fabricated of much lighter sheet metal than is permissible for a housing of the drawn type and to form the housing by a fabricating process not requiring a drawing operation, thus substantially to reduce the housing cost. Since a fabricated housing of this nature would not inherently have the rigidity of a drawn housing, it would further be desirable that one or more removable covers of the housing be secured to the housing in a simple and inexpensive manner which permits ready removal of the cover and yet one which contributes to the housing rigidity while insuring good ignition-interference shielding properties when the cover is assembled to the housing.

It is an object of the present invention to provide a new and improved metallic housing for enclosing an automobile radio receiver, and one which possesses one or more of the desirable characteristics last mentioned.

2

It is a further object of the invention to provide an automobile radio receiver housing of simple and relatively inexpensive construction and yet one having a high degree of rigidity and good ignition-interference shielding properties.

In accordance with a particular form of the invention, an automobile radio receiver metallic housing comprises a continuous wrap-around metallic body section which provides four walls of the housing, a first metallic cover section having flanged edges positioned in telescopic relation with one end of the body section and electrically and mechanically connected thereto, and a readily removable second metallic cover section having flanged edges positioned in telescopic relation with the other end of the body section. The housing includes a plurality of spring contact members positioned between the opposing surfaces of the body and second cover sections for establishing along the length of the opposing surfaces electrical connections between these sections of the housing. These contact members tend unduly to deform and separate the body and second cover sections, thereby to create regions of poor electrical contact between the sections which permit undesirable leakage of automobile ignition interference to the receiver enclosed within the housing. The housing is provided with means including slots provided in the telescoping edge portions of one of the body and second cover sections and tapered-head pull-in studs secured to the other thereof in cooperative relation with the slots for forcing the telescoping edge sections together against the spring action of the contact members to render the housing more rigid and to insure good and consistent electrical contact between the telescoping surfaces upon each assembly of the second cover section to the body section while yet permitting ready removal of the second cover section from the body section.

For a better understanding of the invention together with other and further objects thereof, reference is had to the following description taken in connection with the accompanying drawing, and its scope will be pointed out in the appended claims.

Referring now to the drawing, Figure 1 illustrates the body section and a removable cover section of an automobile radio receiver housing embodying the present invention; Figure 2 is a side view illustrating, partly in cross section, a complete such housing fully assembled; Figure 3 is an enlarged fragmentary view in cross section of a detail of the removable cover section of the housing; and Figure 4 is an enlarged fragmentary view of another detail of the removable cover section and is used more clearly to show the configuration of pull-in studs employed in the construction.

Referring now more particularly to Figures 1 and 2 of the drawing, the automobile radio receiver housing there illustrated includes a continuous wrap-around metallic body section 10 which provides four walls of the housing and which is fabricated by a rolling or stamping operation from a continuous strip of sheet metal. The adjoining ends 11 of the formed strip are fastened together by any suitable means, but are preferably welded along their line of contact.

The housing includes a first or front metallic cover section 12 having flanged edges 13 positioned in telescopic relation with one end of the body section 10 and electrically and mechanically connected thereto as by machine screws 14. This cover section normally supports the radio receiver chassis and loudspeaker, not shown, and is provided with apertures 15 for the passage of sound from the loudspeaker to the exterior of the housing.

The housing also includes a readily removable second or back metallic cover section 16 having flanged edges 17 positioned in telescopic relation with the other end of the body section 10. This cover section is provided with a plurality of small ventilating apertures 18, and supports a plurality of spring contact members 19 which, when the back cover is assembled to the body section 10, are positioned between the opposing surfaces of the body and cover sections for establishing along the length of such surfaces electrical connections between the body and cover sections.

The configuration of the spring contact members 19 is more clearly shown by the enlarged fragmentary view of Figure 3, and it will be seen that they are formed of U-shaped configuration from relatively stiff spring material having struck-out V-shaped teeth 20 which penetrate the surface of the cover material to insure good electrical contact therewith. These leaf-spring contact members, and particularly the struck-out teeth 20 thereof, tend unduly to deform and separate the body and cover sections when the latter are in assembled relation. Any such separation creates regions of poor electrical contact between the body and cover sections and these regions of poor contact permit undesirable leakage of automobile ignition interference to the receiver enclosed within the housing.

The housing therefore is provided with means including slots 21, which may be V-shaped or may have rounded entrance corners, provided in the telescoping edge portion of the body section 10 and tapered-head pull-in studs 22, secured to the flanges 17 of the cover section 16 in cooperative relation with the slots 21, for forcing the telescoping edge portions of the body and cover sections together against the spring action of the contact members 19 upon assembly of the cover section to the body section. This renders the assembled housing more rigid and insures good and consistent electrical contact between the body and cover sections upon each assembly of the cover section to the body section, yet provides a construction which permits ready removal of the cover section from the body section.

The configuration of the pull-in studs 22 is shown more clearly in the enlarged fragmentary view of Figure 4. Each of the studs 22 is riveted to the flange 17 of the cover section, and includes a cylindrical body portion 23 of length only sufficient to permit accommodation of the spring contact members 19 between the flange 17 and the opposing edge of the body section 10. The head of each pull-in stud includes a tapered portion 29 which engages the V-shaped slots 21, or the rounded corners provided at the entrance of each slot, and forces the edge of the body section 10 and the flange 17 of the cover section toward each other as previously mentioned.

The cover section 16 is maintained in assembled relation with the body section 10 by the provision of apertures 24 along the edge of one side of the body section and by the provision of studs 25 secured along a corresponding flange 17 of the cover section 16, and by the further provision of slots 26 along the edge of the opposite side of the body section 10 to receive machine screws 27 (Fig. 2) which are threaded into bosses 28 provided in the corresponding flange of the cover section. While the studs 25 of the cover section are shown as of cylindrical configuration these studs may if desired be pull-in studs having the configuration shown in Figure 4 and the apertures 24 of the body section are then somewhat enlarged and elongated to receive the enlarged head of the pull-in stud.

From the foregoing description of the invention, it will be apparent that an automobile radio receiver housing embodying the invention is of relatively simple and inexpensive construction easily and cheaply fabricated, and yet is one providing adequate mechanical rigidity and the required high degree of electromagnetic shielding for the enclosed receiver. The described construction has the additional advantage that one or both of the housing covers may be easily and readily removable from the housing without impairing the rigidity and electrical shielding desired of the housing in assembled form. A housing embodying the invention has the further advantage that it enables the use of simple and inexpensive electrical contact members which are desirably formed of relatively stiff spring material to insure that the housing shall possess good electromagnetic shielding properties.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A metallic housing for enclosing an automobile radio receiver comprising, a continuous wrap-around metallic body section which provides four walls of said housing, a first metallic cover section having flanged edges positioned in telescopic relation with one end of said body section and electrically and mechanically connected thereto, a readily removable second metallic cover section having flanged edges positioned in telescopic relation with the other end of said body section, a plurality of spring contact members positioned between the opposing surfaces of said body and second cover sections for establishing along the length of said opposing surfaces electrical connections between said body and second cover sections, said contact members tending unduly to deform and separate said body and second cover sections and thereby to create regions of poor electrical contact therebetween which permit undesirable leakage of automobile ignition interference to the receiver enclosed within said housing, and means including slots provided in the telescoping edge portions of one of said body and second cover sections and tapered-head pull-in studs secured to the other thereof in cooperative relation with said slots for forcing said telescoping edge portions together against the spring action of said contact members to render said housing more rigid and to insure good and consistent electrical contact between said surfaces upon each assembly of said second cover section to said body section while yet permitting ready removal of said second cover section from said body section.

2. A metallic housing for enclosing an automobile radio receiver comprising, a continuous wrap-around metallic body section which provides four walls of said housing, a metallic front cover section having flanged edges positioned in telescopic relation with one end of said body section and electrically and mechanically connected thereto, a readily removable metallic back cover section having flanged edges positioned in telescopic relation with the other end of said body section, a plurality of spring contact members positioned between the opposing surfaces of said body and back cover sections for establishing along the length of said opposing surfaces electrical connections between said body and back cover sections, said contact members tending unduly to deform and separate said body and back cover sections and thereby to create regions of poor electrical contact therebetween which permit undesirable leakage of automobile ignition interference to the receiver enclosed within said housing, and means including slots provided in the telescoping edge portions of one of said body and back cover sections and tapered-head pull-in studs secured to the other thereof in cooperative relation with said slots for forcing said telescoping edge portions together against the spring action of said contact members to render said housing more rigid and to insure good and consistent electrical contact between said surfaces upon each assembly of said back cover section to said body section while yet permitting ready removal of said back cover section from said body section.

3. A metallic housing for enclosing an automobile radio receiver comprising, a continuous wrap-around metallic body section which provides four walls of said housing, a first metallic cover section having flanged edges positioned in telescopic relation with one end of said body section and electrically and mechanically connected thereto, a readily removable second metallic cover section having flanged edges positioned in telescopic relation with the other end of said body section, a plurality of leaf-spring contact members positioned between the opposing surfaces of said body and second cover sections at closely spaced points along the length of said opposing surfaces to provide electrical connections at said points between said body and second cover sections, said contact members tending unduly to deform and separate said body and second cover sections and thereby to create regions of poor electrical contact therebetween which permit undesirable leakage of automobile ignition interference to the receiver enclosed with said housing, and means including slots provided in the telescoping edge portions of one of said body and second cover sections and tapered-head pull-in studs secured to the other thereof in cooperative relation with said slots for forcing said telescoping edge portions together against the spring action of said contact members to render said housing more rigid and to insure good and consistent electrical contact between said surfaces upon each assembly of said second cover section to said body section while yet permitting ready removal of said second cover section from said body section.

4. A metallic housing for enclosing an automobile radio receiver comprising, a continuous wrap-around metallic body section which provides four walls of said housing, a readily removable second metallic cover section having flanged edges positioned in telescopic relation within the other end of said body section, a plurality of spring contact members positioned between the opposing surfaces of said body and second cover sections for establishing along the length of said opposing surfaces electrical connections between said body and second cover sections, said contact members tending unduly to deform and separate said body and second cover sections and thereby to create regions of poor electrical contact therebetween which permit undesirable leakage of automobile ignition interference to the receiver enclosed with said housing, and means including slots provided in the edge portion of said body section and tapered-head pull-in studs secured to the flanges of said second cover section in cooperative relation with said slots for forcing said telescoping edge portions together against the spring action of said contact members to render said housing more rigid and to insure good and consistent electrical contact between said surfaces upon each assembly of said second cover section to said body section while yet permitting ready removal of said second cover section from said body section.

5. A metallic housing for enclosing an automobile radio receiver comprising, a continuous wrap-around metallic body section which provides four walls of said housing, a front metallic cover section having flanged edges positioned in telescopic relation with one end of said body section and electrically and mechanically connected thereto, a readily removable metallic back cover section having flanged edges positioned in telescopic relation with the other end of said body section, a plurality of spring contact members positioned between the opposing surfaces of said body and back cover sections for establishing along the length of said opposing surfaces electrical connections between said body and back cover sections, said contact members tending unduly to deform and separate said body and back cover sections and thereby to create regions of poor electrical contact therebetween which permit undesirable leakage of automobile ignition interference to the receiver enclosed within said housing, and means including V-shaped slots provided in the telescoping edge portions of said body section and tapered-head pull-in studs secured to the flanges of said back cover section in cooperative relation with said slots for forcing said telescoping edge portions together against the spring action of said contact members to render said housing more rigid and to insure good and consistent electrical contact between said surfaces upon each assembly of said back cover section to said body section while yet permitting ready removal of said back cover section from said body section.

VERLIS H. WILEY.

REFERENCES CITED

The following references are of record in the file of this patent:

UNITED STATES PATENTS

| Number | Name | Date |
|---|---|---|
| 1,177,847 | Bosworth et al. | Apr. 4, 1916 |
| 1,945,795 | Wilcox | Feb. 6, 1934 |
| 2,065,651 | Burton | Dec. 29, 1936 |
| 2,130,243 | Mitchell | Sept. 13, 1938 |
| 2,225,722 | Spieth | Dec. 24, 1940 |
| 2,313,881 | Lewis | Mar. 16, 1943 |
| 2,317,813 | Schoenborn | Apr. 27, 1943 |
| 2,473,977 | Tutton | June 21, 1949 |

FOREIGN PATENTS

| Number | Country | Date |
|---|---|---|
| 794,713 | France | Feb. 24, 1936 |